114-294 SF
11/4/86 X3 RE 32,274

United States Patent [19]
Burchett

[11] E Patent Number: Re. 32,274
[45] Reissued Date of Patent: Nov. 4, 1986

[54] MARINE TETHER ANCHORING DEVICE

[75] Inventor: Clive J. Burchett, Woodlands, England

[73] Assignee: Vickers Public Limited Company, London, England

[21] Appl. No.: 675,598

[22] Filed: Nov. 28, 1984

Related U.S. Patent Documents

Reissue of:
[64] Patent No.: 4,459,933
Issued: Jul. 17, 1984
Appl. No.: 315,603
Filed: Oct. 30, 1981

[51] Int. Cl.[4] ..... B63B 21/26; F16B 1/04; F16D 3/00

[52] U.S. Cl. ..... 114/297; 114/294; 114/230; 405/224; 294/86.25

[58] Field of Search ..... 114/293, 294, 264, 265, 114/230, 297; 403/290, 297; 405/224; 166/212, 217, 206, 354, 338, 340, 125; 294/89, 86.18, 94, 86.25, 86.15; 285/308, 309, 321, 330, 141, 334.3

[56] References Cited

U.S. PATENT DOCUMENTS

| | | | |
|---|---|---|---|
| 3,199,906 | 8/1965 | Chenoweth | 294/86.15 |
| 3,429,286 | 2/1969 | Alghisi | 114/52 |
| 3,560,032 | 2/1971 | Cohen et al. | 403/290 |
| 3,638,988 | 2/1972 | Brown | 294/86.25 |
| 3,999,605 | 12/1976 | Broddick | 166/212 |
| 4,347,012 | 8/1982 | Glidden | 114/230 |
| 4,432,670 | 2/1984 | Lawson | 405/224 |
| 4,439,055 | 3/1984 | Quigg et al. | 403/330 |
| 4,459,933 | 7/1984 | Burchett | 114/297 |

FOREIGN PATENT DOCUMENTS 1341373 12/1973 United Kingdom .

OTHER PUBLICATIONS

UK Patent App. #2035240A, 6/18/1980, Barrett et al.

*Primary Examiner*—Galen L. Barefoot
*Assistant Examiner*—Edwin L. Swinehart
*Attorney, Agent, or Firm*—Pollock, Vande Sande and Priddy

[57] ABSTRACT

A marine tether anchoring device comprises an anchor body and a segmented spring collet that moves axially relative to the anchor body. As the anchor body moves downwardly relative to the collet the upper end of the collet is expanded by a wedge structure which is attached to the anchor body and lockingly engages the wall of an anchoring chamber. The lower end of the tether line is attached to the wedge structure and cannot escape from the anchoring chamber. Release is effected by slackening the tension on the tether line and supplying fluid to a piston supported in the anchor body so that the piston forces the collet downwardly and releases the segments of the spring collet from the face of the wedge structure. Retraction of the collet is completed by a cam ring that engages faces on the collet as final downward travel of the collet takes place.

19 Claims, 3 Drawing Figures

MARINE TETHER ANCHORING DEVICE

Matter enclosed in heavy brackets [ ] appears in the original patent but forms no part of this reissue specification; matter printed in italics indicates the additions made by reissue.

FIELD OF THE INVENTION

The invention relates to marine tether anchoring devices.

BACKGROUND TO THE INVENTION

Various methods are known for fixing tethers of drilling platforms, and the like, in position and it is an object of the present invention to provide an improved marine tether anchoring device which can be released and re-established if necessary and as required.

SUMMARY OF THE INVENTION

According to the invention, there is provided a marine tether anchoring device comprising an anchor body, a segmented spring collet surrounding said body movable axially relative thereto and arranged to be expanded at its upper end by wedging means attached to said anchor body as said anchor body moves downwardly relative to said collet so that the expanded upper end of the collet lockingly engages the wall of an anchoring chamber and the lower end of a tether line attached to said wedging means cannot escape from said anchoring chamber, and controllable actuator means in said body operable to move the collet downwardly relative to said body so that the upper end of the collet is released from the wedging means and can retract away from the wall of the anchoring chamber to provide an unlocked condition of said device.

The device is self-locking under gravity since the weight of the anchor body and tether line will automatically pull the wedging means downwards and expand the collet. But when the tether line is under tension the collet is locked in its expanded state since it is only free to expand when the collet is spaced from the locking surface at the mouth of the anchoring chamber.

*According to the invention there is further provided a marine tether anchoring device comprising*

*an anchoring chamber for installation in the seabed having a mouth that provides a locking surface*

*a tether line having an enlarged lower end that is insertable through said mouth into said anchoring chamber*

*a collet that surrounds the lower end of the tether line and has upwardly facing segments that in a retracted state pass said mouth of said anchoring chamber and in an expanded state latch at their tips behind said mouth of said anchoring chamber; and*

*wedging means relative to which the collet moves axially to expand said segments, said wedging means providing a load path between said enlarged lower end of said tether line and said collet so that in the latched position the expanded lower end of the tether line is located below the tips of the collet segments and tension in the tether line is transmitted from said expanded portion as a compressive load through said wedging means and said tips of said collet segments to said mouth of said anchoring chamber.*

*The aforesaid anchoring device has the advantage that the major load-carrying components other than the tether line are in compression, giving a very high intrinsic safety level, and the load line is very short and straight.*

BRIEF DESCRIPTION OF DRAWINGS

An embodiment of the invention will now be described, by way of example, with reference to the accompanying drawings, in which.

DETAILED DESCRIPTION OF ILLUSTRATED EMBODIMENTS

Figure 3:
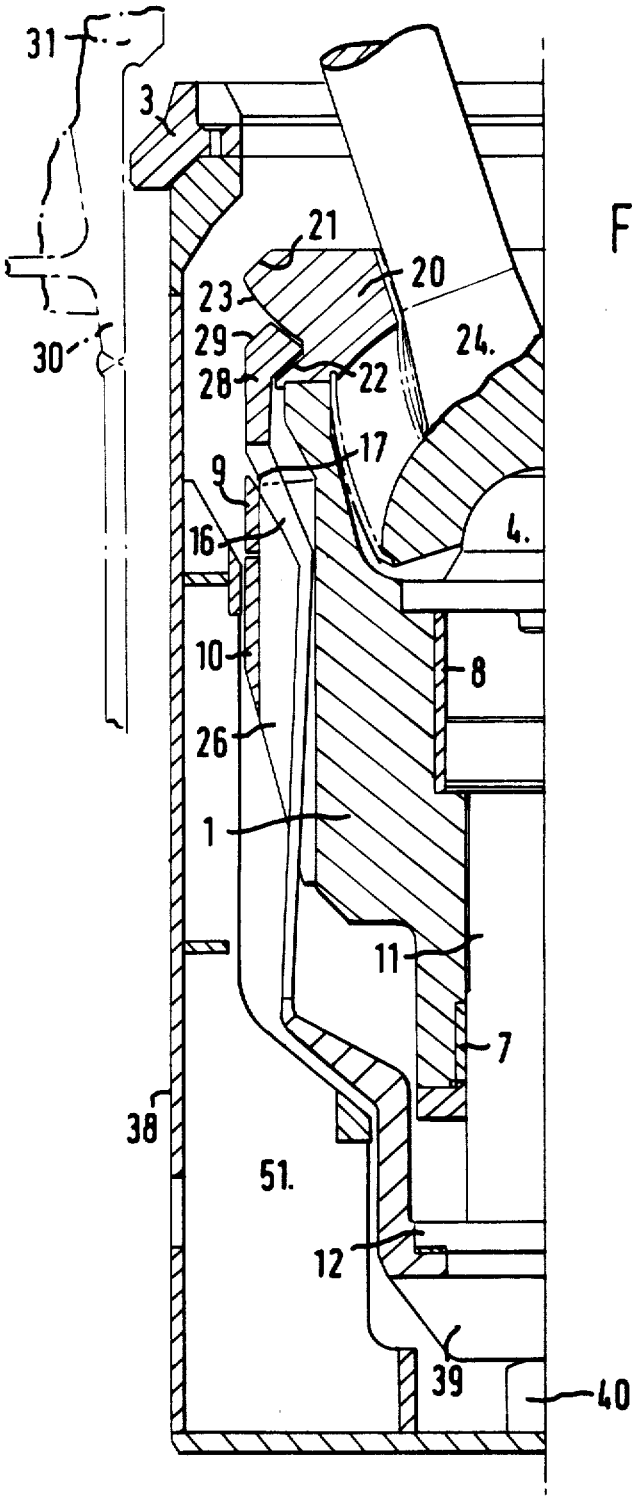
FIG. 3 is a sectional elevation of one half of the device in a release condition and with the tether line at an angle to the vertical.

In the drawings an anchor body 1 extends upwards to a locking ring 20 to which it is secured by means of studs 14. The ring 20 has on its exterior an upper frustoconical surface 21 of larger diameter and a lower frustoconical surface 22 of smaller diameter interconnected by a surface 23. The interior surface of ring 20 is connected by a so-called flexijoint assembly 37 of elastomer and metal to a flared lower end 24a of a tether line 24. The end 24a has a cup-shaped inner surface that is supported by a spherical seat 4 bolted to the body 1. The purpose of the flexijoint assembly which is resiliently deformable is to permit limited angular movement of the tether line 24 relative to the anchor body 1 as shown in FIG. 3. The body 1 has a series of radial fins 26 that support a cam ring 9 and an abrasion ring 10. A spring collet 2 surrounds the body 1 and extends from a base 27 at its lower end to flanged fingers 28 at its upper end. The fins 26 protrude through slots defined between adjacent fingers 28. The hooked upper ends of the fingers 28 either engage the upper surface 21 or define a radially expanded state of the fingers 28 or engage the lower surface 22 to define a collapsed state thereof. The top ends of the fingers 28 are also formed with bearing surfaces 29.

The tether line 24 is formed with a central passage that communicates with an axial bore 36 through the seat 4. Fluid under pressure pumped down the central passage presses on the top face of a piston or so-called "thrust column" 11 that is supported in the body 1 in upper and lower bearings 8, 7 and terminates at its lower end in a flange 12.

The structure that is secured to the seabed includes a mooring sleeve 30 having an abutment ring 31 at its upper end. A so-called template insert 38 that defines an anchoring chamber is a loose fit within the mooring sleeve 30 and has at its upper end a locking ring 3 that seats against the abutment ring 31 so that the template insert cannot be withdrawn from the mooring sleeve. According the template insert 38 can move up and down within the mooring sleeve 30 between its operational (FIG. 2) and release (FIG. 3) states but is permanently retained. The mooring sleeve 30 is provided with internal guide ribs 50 that locate the template insert, and similarly the template insert 38 is provided with guide ribs 51 that locate the assembly of anchor body and collet. A buffer 39 at the lower end of the collet 2 locates against a support 40 on the floor of the template insert to arrest downward travel of the anchor body and collet.

Figure 1:
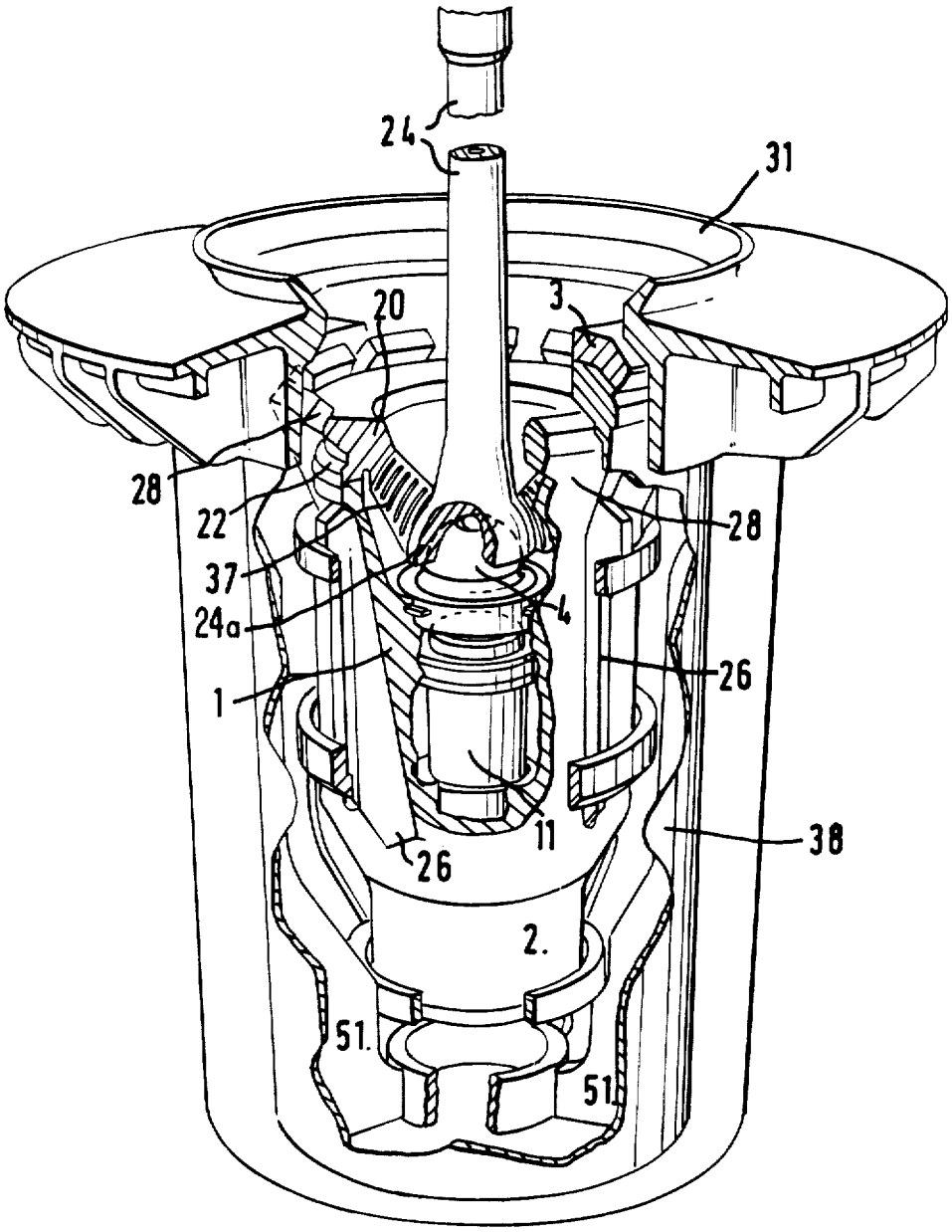
FIG. 1 is a cut-away view of a marine tether anchoring device.
Figure 2:
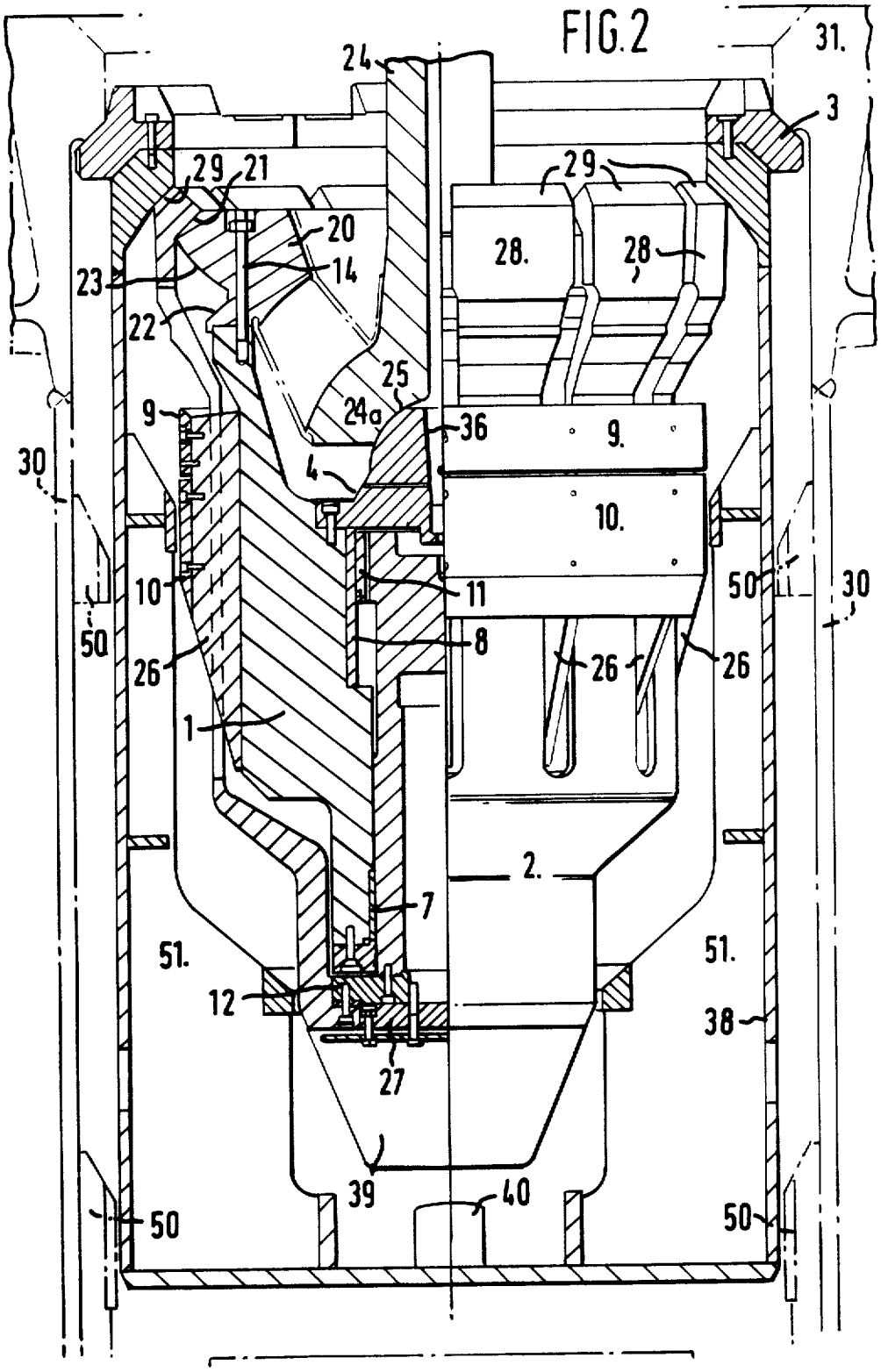
FIG. 2 is a part-sectional elevation of the device in an operational or locked condition.

In FIG. 3 the anchoring device is shown in an unlocked condition with the template insert 38 at its release position within the mooring sleeve 30 so that locking ring 3 is spaced from abutment ring 31. The tether line is lowered so that the assembly of anchor body 1 and collet 2 enters the template insert 38. The collet is maintained in its collapsed state by the cam ring 9 that fits over an external shoulder 17 on the collet. The assembly moves downwards until the buffer 39 touches the support 40 after which no further downward movement of the collet 2 takes place. But the anchor body 1 continues to move downwardly unde the weight of the tether line 24, disengaging ring 9 from shoulder 17 to permit partial expansion of the collet which is then fully expanded as fingers 28 travel over surface 23 of the locking ring until their hooked ends locate onto its upper surface 21. As this happens, the base 27 of the collet thrusts the column or piston 11 from the position shown in FIG. 3 upwardly to the position shown in FIG. 2. By this means the device reaches its locked state. As tension is applied to the tether line 24 the body 1 rises taking the collet 2 upwards with it until the surface 21 engages the corresponding surface of the template insert. Thereafter the end [23] *24a* of the tether line cannot escape from the template insert and the ends of the fingers 28 are held between the locking ring 20 and the upper end of the template insert so that they cannot disengage. Continued raising of the tether line brings the locking ring 3 into contact with the abutment ring 31 as shown in FIG. 2.

*It will be noted that the tension in tether line (24) is transmitted via its flared end (24a) as an upwards and outwards compressive load in flexjoint assembly (27). The load is further taken in compression by the locking ring (20) and by the top ends of the fingers (28) which pass their load to the mouth of the template insert (38).*

The procedure for unlocking the device is as follows. Tension is removed from the tether line 24 to allow the template insert 38 to move downwards, normally under its own weight from the position shown in FIG. 2 an the body 1 and collet 2 to move downwardly into the template insert. Then fluid is pumped down the interior of the line 24 and flows through the central hole 36 in spherical seat 4 and drives the piston or thrust column 11 downwardly. This forces the collet 2 downwards disengaging fingers 28 from the upper surface 21 of the locking ring. Continued downward movement of the collet causes the ramp 16 to travel past cam ring 9 which finally engages the shoulder 17 to retain the collet in its fully collapsed state in which the fingers 28 engage lower surface 22 of the locking ring 20. The collet 2 will then pass out of the template insert 38 when tension is again applied to the tether line 24.

Thus a relatively simple releasable tether connection is provided. The planar mating surfaces 21 between the locking ring 20 and the fingers 28 in the locked condition is preferably at approximately 45° to the axis of the body 1.

I claim:

1. A marine tether anchoring device comprising in combination:

(a) an anchor body;

(b) a segmented spring collet surrounding said body, movable axially relative thereto and having an expandible upper end;

(c) wedging means attached to said anchor body, said wedging means being arranged to expand the upper end of said collet as said anchor body moves downwardly relative to said collet and having means defining a surface with which the segments of said collet latch to define the expanded state of said collet;

(d) an anchoring chamber into which said anchor body and collet may be inserted and including a wall that the upper end of the collet lockingly engages in its expanded state;

(e) a tether line having a lower end connected to said wedging means so that said lower end cannot escape from said anchoring chamber when said collet is wedged in its expanded state; and (f) controllable actuator means in said body operable to move said collet downwardly relative to said body so that the upper end of said collet is unlatched from said surface on said wedging means and can retract away from the wall of the anchoring chamber to permit withdrawal of the anchor body and collet as the tether line is pulled upwards.

2. A device according to claim 1, wherein adjoining segments of said collet define slots, radial fins attached to said body project through said slots, guide fins are provided in said anchoring chamber and a ring supported on said radial fins cooperates with said guide fins to position said anchor body and collet in said anchoring chamber.

3. A device according to claim 1 wherein further means on said wedging means defines a surface which the segments of said collet engage to define its retracted state.

4. A device according to claim 3, wherein said wedging means is a ring and said surfaces are frustoconical.

5. A device according to claim 4, wherein the neutral state of said collet is between its expanded and retracted states, a cam ring is supported on said radial fins and means defines guide surfaces on the exterior of said collet to urge the collet to its fully retracted state as said collet moves to its fully downwards position relative to said anchor body.

6. A device according to claim 1, in which said actuator means comprises a piston in said body.

7. A device according to claim 6, wherein said tether line is formed with an internal passage down which fluid may be pumped to actuate said piston.

8. A device according to claim 7, wherein means defines a cup-shaped surface at the lower end of said tether line, a ball shaped support is secured to the top of the anchor body on which said cup-shaped surface is supported, and means in said support defines an axial through hole that communicates said internal passage with said piston.

9. A device according to claim 8, wherein a flexible connector attaches the lower end of said tether line to said wedging means.

10. A device according to claim 1, wherein the wedging means and the upper end of the collet have planar mating surfaces that in the locking condition are substantially at 45 degrees to the axis of the body.

*11. A marine tether anchoring device comprising*

*an anchoring chamber for installation in the seabed having a mouth that provides a locking surface;*

*a tether line having an enlarged lower end that is insertable through said mouth into said anchoring chamber;*

*a collet that surrounds the lower end of the tether line and has upwardly facing segments that in a retracted state pass said mouth of said anchoring chamber, the uppermost ends of said segments defining tips which in an expanded state of said segments latch behind said mouth of said anchoring chamber; and*

*wedging means relative to which the collet moves axially to expand said segments, said wedging means providing a load path between said enlarged lower end of said tether line and said collet so that in the latched position the expanded lower end of the tether line is located below said tips of the collet segments and tension in the tether line is transmitted from said expanded portion as a compressive load through said wedging means and said tips of said collet segments to said mouth of said anchoring chamber.*

*12. A device according to claim 11, wherein the wedging means includes a resilient inner member adjacent the lower end of the tether line and a rigid outer member adjacent the collet.*

*13. A device according to claim 12, wherein the lower end of the tether line is also formed with a cup-shaped surface that when tension on said tether line is relieved rests on a part spherical support.*

*14. A device according to claim 13, wherein the part spherical support is carried by the wedging means.*

*15. A device according to claim 11, wherein the collet is a segmented spring collet.*

*16. A device according to claim 15 wherein the wedging means is provided with a first surface onto which the collet segments latch to define an expanded state of the collet and a second surface onto which the collet segments latch to define a retracted state thereof.*

*17. A device according to claim 16 wherein said wedging means is a ring and said first and second surfaces are frustoconical.*

*18. A device according to claim 11 wherein downward movement of the wedging means relative to the collet expands the collet.*

*19. A device according to claim 18 wherein said anchoring chamber has a protuberant member arranged to stop downward movement of said collet as said tether line is lowered into said anchoring chamber, said collet being expanded by continued downward movement of said tether line and wedging means.*

* * * * *